Figures 1, 2:
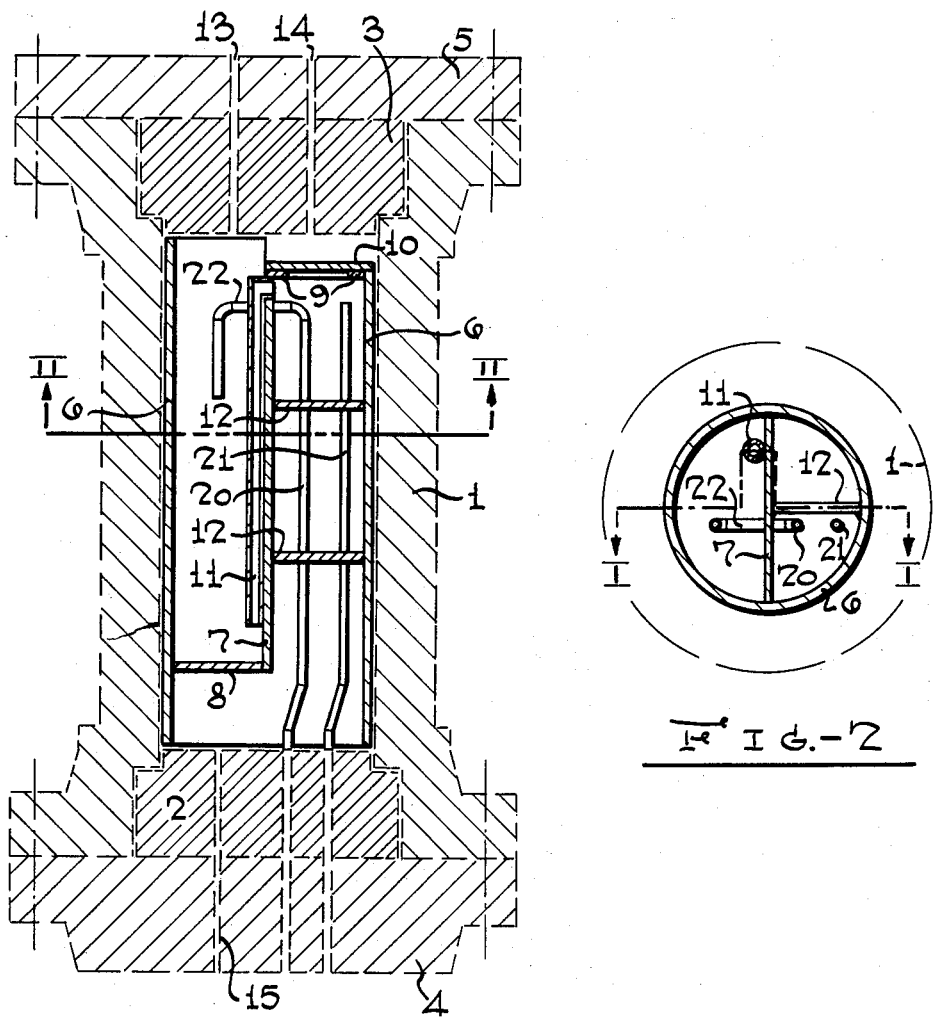

July 21, 1953     R. L. JACKS ET AL     2,646,347

TWO-PASS HIGH-PRESSURE REACTOR

Filed May 21, 1952

Robert L. Jacks
Gipson L. Carter   Inventors

By J. W. O. Heilman, Attorney

Patented July 21, 1953

2,646,347

UNITED STATES PATENT OFFICE 2,646,347

TWO-PASS HIGH-PRESSURE REACTOR

Robert L. Jacks and Gipson L. Carter, Baton Rouge, La., assignors to Standard Oil Development Company, a corporation of Delaware Application May 21, 1952, Serial No. 289,228

5 Claims. (Cl. 23—289)

This invention concerns a novel form of high pressure reaction vessel providing for the two-pass uni-directional flow of materials through the reactor. The apparatus of this invention is particularly characterized by the simple inexpensive and effective fabrication of the reactor internals. The invention is of particular application to the conversion of a single zone high pressure reactor to a two-pass uni-directional flow reactor.

At the present time, in the oil refining and chemical industries, a great many processes necessitate use of extremely high pressures. High pressure processes impose serious problems of apparatus fabrication suitable for sustaining the high pressures required. It is the purpose of this invention to provide a novel form of high pressure reaction vessel which is uniquely simple and inexpensive to construct. This objective is achieved by utilizing a massive elongated tubular element as a high pressure shell. Within this high pressure shell, thin-walled partitions are used to provide the desired two-zone system including provision for uni-directional flow through the two zones.

A reactor embodying the invention is particularly useful in converting a single zone, single pass reactor for the purposes of this invention. Thus, in accordance with this invention, thin-walled, structurally-weak partitions may be employed to provide the two-zone high pressure system.

The present invention is also of particular application to processes requiring heat exchange during the conduct of the process. Thus the apparatus of this invention includes provision for insertion of heating or cooling coils in both of the two zones of the high pressure system. It becomes practical therefore to either heat or cool a given stream of reactants at any portion of the flow path through the two zones of the reactor.

In large part the advantages of this invention reside in the practicality of assembly. Thus the apparatus configuration employed enables use of a tubular reactor of limited size preventing a person from entering the reactor to assemble component parts thereof. This feature is particularly important in considering application of the apparatus to a process requiring beds of packing material or solid catalyst in different portions of the reactor.

The nature of this invention and the manner in which the objectives identified are achieved may be understood from the accompanying drawing, in which:

Figure 1 diagrammatically illustrates a preferred form of the invention in cross-sectional elevational detail, along line I—I of Figure 2.

Figure 2 illustrates in cross-section, along the line II—II of Figure 1, the particular arrangement of the central partition member and the upflow conduit to provide the two high pressure zones.

Referring to the drawing, the massive elongated tubular member 1 provides the high pressure sustaining element of the apparatus. Tubular member 1 is constructed in a manner to permit safe utilization of the pressure required in a particular process according to conventional engineering practices. At either end of the tubular member 1 closure members 2, 3, 4, and 5 are provided in order to seal off either and both ends of the tubular opening within shell 1. Each of the closure members 2 and 3, if desired, may be provided with threads so as to mate with and seal within either end of the tubular shell, while members 4 and 5 may be bolted in position.

As described heretofore, the shell 1, with suitable closure members at either end, provides a single zone reaction space within the cavity thereof. It is apparent that a reactor of this nature is conventionally used for high pressure reaction systems. Suitable flow inlets are ordinarily provided through each of the closure members to permit one-pass operation. In accordance with the present invention, an apparatus of this character is modified by inclusion and utilization of the remaining elements of the drawing.

A thin-walled sleeve member 6 is constructed to fit closely within the cavity of the shell 1. As will be apparent, sleeve member 6 is not subjected to high pressure stress so that the material and construction of sleeve 6 is not critical. Preferably sleeve 6 should extend substantially from the bottom to the top of the shell 1 in the space limited by the closure members. A dividing partition 7 preferably bi-sects the reactor cavity and is sealed to either side of sleeve 6. This partition is shorter than the sleeve 6 so as to terminate within either end of the sleeve 6. Again, partition 7 is not exposed to high pressure stresses so that the fabrication of this partition is not difficult. The partition may be held in position by suitable braces extending from the shell 6 as illustrated. The lower end of partition 7 is joined to a plate element 8 which is sealed to sleeve 6 so as to seal off one of the bi-sected zones within sleeve 6. For this purpose a blank may be welded to partition 7 and sleeve 6, having a semi-circular configuration. At the other end of the reactor, supports 9 are provided to accommodate a second blank 10 which may be removably positioned to similarly seal the opposite semi-circular portion of the reactor. Thus, supports 9 may constitute welded extensions of the partition 7 and sleeve 6, leaving an opening of substantial size. The blank 10 may then be used to block this opening by bolting or welding this blank in position when required. As will be seen, provision for insertion or replacement of the top blank 10 is an important feature of this invention.

Finally, a conduit 11 is positioned along partition 7 and is passed through this partition at one end thereof so as to provide conduit openings adjacent to each of the two blanks. Thus, as illustrated, the conduit 11 can extend from the lower portion of the left-hand zone of the reactor, adjacent blank 8, upwardly through the top of partition 7 to a point just below the upper blank 9. Structural support for the conduit 11 and the partition 7 may conveniently be provided by suitable braces 12 extending from one or both sides of the shell 6.

The apparatus illustrated in Figures 1 and 2 thus simply and effectively provides for two-pass uni-directional flow of reactants through the high pressure reactor. Reactants, for example, may be brought into the reaction zone at the upper portion thereof through either or both of the inlets 13 or 14. Reactants will then travel downwardly through the left-hand zone of the reactor, upwardly through conduit 11, and downwardly through the right-hand zone of the reactor. The reactants or products of the reaction may then be removed through a withdrawal passage 15 at the lower portion of the reactor. They may, of course, also be passed, upflow, in the opposite sequence.

This apparatus may be used for high pressure hydrogenation or again, for example, to conduct the well known aldehyde synthesis process in which an olefin, carbon monoxide, and hydrogen are reacted at about 3,000 lbs. p. s. i. g. A suitable catalyst is employed for this reaction. The reaction zone may be packed, if desired. The reaction is exothermic and requires cooling during the conduct thereof. The apparatus illustrated is particularly useful in a process of this character.

For this type of application, at least a pair of upwardly extending conduits 20 and 21 are sealed to suitable passages through the lower closure member 4. These conduits may be inserted in position as upwardly extending pipe members prior to insertion of the shell 6. After insertion of shell 6 a gooseneck pipe connection 22 may be passed through an upper portion of partition 7 so as to extend downwardly in the left-hand zone of the reactor. If desired, the gooseneck pipe connection 22 may be welded to pipe 20 and may be welded in the partition 7 to maintain fluid-tight conditions. Flange or union-type connections are preferred, however, for ease of removal. Thereafter the upper blank plate 10 may be inserted in position to seal off the two zones of the reactor as formerly descibed. By this method of fabrication, pipes of the character described may be used to terminate at any desired portion of either of the two reaction zones. This makes possible the introduction of desired cooling fluids at any localized points within the reactor.

The reactor is also well adapted for insertion of solid catalyst or beds of packing material. Suitable supports for perforated grills may be provided in either of the two zones on the partition and the shell 6. After placement of perforated supports, packing material or catalysts may be deposited in the reactor from the top prior to installation of the blank plate 10.

In the apparatus described it is particularly desirable to seal the sleeve 6 with respect to the reactor shell 1 at at least one end. Thus, for example, sleeve 6 may be welded to shell 1 at the uppermost portion of the sleeve. This provision eliminates the possibility for by-passing of reactants in the limited annular space between the sleeve 6 and the shell 1. It is to be noted however that this weld is not imposed to high pressure stress.

As described therefore, the present invention concerns a form of high pressure reactor in which light-weight, thin-walled partitions are provided in a massive pressure resistant shell. The partitions described are so arranged to permit convenient insertion while permitting utilization of heating or cooling coils, solid packing material, and the like. The reactor is constructed to prevent possibility of by-passing or leakage of the reactants from one zone into the other. It is apparent that the reactor may be employed either for upflow or for downflow usage, with the same direction of flow prevailing in each zone. The reactor is therefore particularly qualified for conversion of a particular single-zone high pressure reactor to a two-pass form providing twice the normal flow velocity and improved reaction control within a single high pressure vessel. In this connection it should be observed that the advantages of this invention cannot be achieved by employing an annular partition member in place of the bi-secting partition described. Temperature control and problems of fabrication in an annular type separation obviate the advantages described.

What is claimed is:

1. A two-pass, uni-directional flow, high pressure reactor comprising in combination: a tubular pressure resistant shell having top and bottom closure members, a thin-walled sleeve member fitting within said shell in close fitting relation, a partition member extending parallel to the principal axis of the sleeve and intersecting the walls thereof in fluid-tight relation, terminating at a spaced distance from both the top and bottom of the sleeve, a first sealing member extending from one side of the partition to the sleeve at the bottom thereof, and a second sealing member extending from the opposite side of the partition to the sleeve at the top thereof, and a conduit member extending through the partition adjacent one of said sealing members to a point adjacent the other of said sealing members.

2. The reactor defined by claim 1 in which at least one of said sealing members is removable.

3. The reactor defined by claim 1 in which said top and bottom closure members include fluid passages to the said sleeve.

4. The reactor defined by claim 1 in which the said sleeve is sealed to the said shell at one end thereof.

5. The reactor defined by claim 1 in which at least a pair of conduits extend through one of said closure members on one side of the partition at one end thereof and in which one of said conduits passes through the partition adjacent the opposite end thereof.

ROBERT L. JACKS.
GIPSON L. CARTER.

No references cited.